B. M. DIVER.
LICENSE HOLDER AND ILLUMINATOR.
APPLICATION FILED SEPT. 29, 1919.
1,368,026.
Patented Feb. 8, 1921.
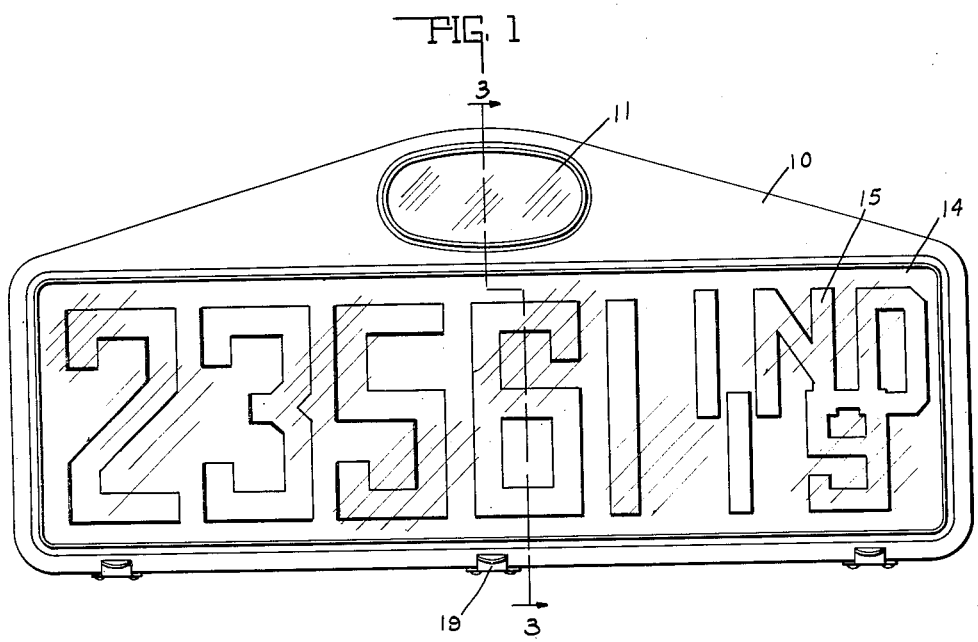
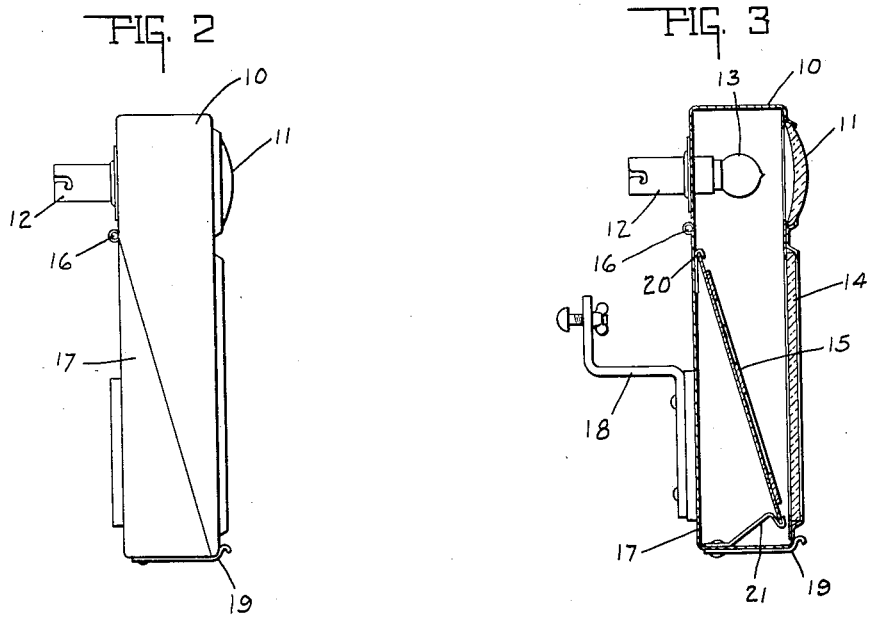
INVENTOR.
BERTICE M. DIVER.
BY
Lockwood Lockwood
ATTORNEYS.

UNITED STATES PATENT OFFICE.

BERTICE M. DIVER, OF INDIANAPOLIS, INDIANA.

LICENSE HOLDER AND ILLUMINATOR.

1,368,026.

Specification of Letters Patent.

Patented Feb. 8, 1921.

Application filed September 29, 1919. Serial No. 327,220.

*To all whom it may concern:*

Be it known that I, BERTICE M. DIVER, a citizen of the United States, and a resident of Indianapolis, county of Marion, and State of Indiana, have invented a certain new and useful License Holder and Illuminator; and I do hereby declare that the following is a full, clear, and exact description thereof, reference being had to the accompanying drawings, in which like numerals refer to like parts.

This invention relates to a license plate holder and illuminator particularly adapted for motor vehicles.

The main object of this invention is to provide a housing or casing to be secured on the front and rear of a motor vehicle in which the license plate may be secured for protecting it from dust and dirt and from mutilation, such as is common with the unprotected parts projecting out from the vehicle body. By means of this device the plate will not only be well secured to the vehicle but will always appear neat and clean and form an attractive part of the vehicle.

Another feature of the invention is to so arrange the plate within the casing that the same lamp used for a tail light will illuminate the license plate, which illumination will be reflected and diffused within the casing so that all parts of the plate will be clearly visible in the dark. This arrangement may also be used for the front part of the vehicle in connection with the green light thereon for use in parking the vehicle.

Other features of the invention relating to the construction and the method of forming the casing and securing the plate therein will more fully appear in the following specification and drawing.

Referring to the drawings, Figure 1 is a front elevation of the license holder. Fig. 2 is an end elevation of the license holder. Fig 3 is a cross section taken on the line 3—3 of Fig. 1.

In the drawings there is shown a casing or housing 10 which is substantially oblong in shape corresponding to the usual type of license plate for motor vehicles, and having a top portion above the license plate portion in which there is mounted a red lens 11 for the rear casing, or a green lens for the front casing. Extending into the casing from the rear thereof and in the upper portion there is a lamp socket 12 in which an incandescent lamp 13 is mounted directly in the rear of the lens 11. A front portion of the casing is provided with an opening in which is secured a plate glass front 14 for forming the entire front surface of the casing behind which the license plate 15 is mounted, whereby the entire surface of the license plate mounted within the casing will be visible through the plate glass. The body portions of the casing 10 is hinged at 16 to a rear fixed portion 17 which is secured to the vehicle by means of the brackets 18 so that access to the interior of the casing, for inserting a new bulb or a new license plate, may be had by lifting the forward part thereof upwardly upon the hinges 16. The casing 10 is located about the fixed portion 17 by the spring guides 19 which catch upon the lower edge thereof and hold it securely in closed position. The license plate 15 is yieldingly secured within the casing by the engagement of its upper edge in an overhanging hooked plate 20, and its lower edge in the yielding spring plate 21, both of which are secured to the bottom of the fixed portion 17.

The interior of the upper portion of the plate 10 may be silvered or painted white so as to reflect the light from the lamp 15 down upon the surface of the license plate so that it may be plainly visible after dark through the glass front, the rays from said lamp projecting directly through the red or green lens 11, giving the proper light signals for vehicles.

The invention claimed is:

1. A signal lamp and license bracket for vehicles including a divided casing adapted to be rigidly mounted upon a vehicle, hinge means at one of said divided edges of said casing for providing access to the interior of said casing, yielding means for locking said divided casing portions in closed position, a source of illumination in the upper portion of said casing, a license plate removably held in slanting position beneath said source of illumination for receiving the illumination on the face of said plate, said plate being supported by the rigidly mounted portion of said casing, yielding spring bracket means for removably securing said license plate to said rigidly mounted casing portion, a lens in the upper portion of said casing in front of said source of illumination, and a transparent plate in the same wall of said casing and beneath said lens and in front of said license plate.

2. A signal lamp and license bracket for vehicles including a diagonally divided casing adapted to be rigidly mounted upon a vehicle, hinge means at one of said divided edges of said casing for providing access to the interior of said casing, yielding means for locking said diagonally divided casing portions in closed position, a source of illumination in the upper portion of said casing, a license plate removably held in slanting position beneath said source of illumination for receiving the illumination on the face of said plate, said plate being supported by the rigidly mounted portion of said casing, yielding spring bracket means for removably securing said license plate to said rigidly mounted casing portion, a lens in the upper portion of said casing in front of said source of illumination, and a transparent plate in the same wall of said casing and beneath said lens and in front of said license plate.

In witness whereof I have hereunto affixed my signature.

BERTICE M. DIVER.